United States Patent [19]

Zolke et al.

[11] 4,057,986
[45] Nov. 15, 1977

[54] SELF-CONTAINED ALARM LOCK

[76] Inventors: Sarah Zolke, 5246 Pratt, Skokie, Ill. 60076; William Soto, 330 Springfield Drive, Apt. 301, Roselle, Ill. 60172

[21] Appl. No.: 706,474

[22] Filed: July 19, 1976

[51] Int. Cl.² .............................................. B60R 25/10
[52] U.S. Cl. .......................................... 70/233; 70/14; 70/18; 70/58; 70/DIG. 49
[58] Field of Search ................... 70/233, 234, 30.58, 70/49.14, 15, 18, DIG. 49; 340/256, 63, 280, 283; 339/253 R, 253 F, 253 L, 253 S; 116/33, 77, 81; 292/179, 106, 302

[56] References Cited

U.S. PATENT DOCUMENTS

| 604,577 | 5/1898 | Brigden | 70/15 |
|---|---|---|---|
| 648,710 | 5/1900 | Quelch | 339/253 R X |
| 2,022,669 | 12/1935 | Keefe | 339/253 S X |
| 2,465,008 | 3/1949 | Carlson | 70/49 |
| 3,611,760 | 10/1971 | Muther | 70/18 |
| 3,690,130 | 9/1972 | Eutzler | 70/18 |
| 3,755,778 | 8/1973 | Kennedy | 70/233 |
| 3,772,645 | 11/1973 | Odenz et al. | 70/234 |
| 3,824,540 | 7/1974 | Smith | 70/233 X |
| 3,974,492 | 8/1976 | Girismen | 340/256 X |
| 3,990,276 | 11/1976 | Shontz | 70/49 X |

FOREIGN PATENT DOCUMENTS

| 1,086,145 | 7/1960 | Germany | 292/302 |
|---|---|---|---|
| 69,961 | 1/1946 | Norway | 292/302 |

Primary Examiner—Marion Parsons, Jr.
Assistant Examiner—Rodney H. Bonck
Attorney, Agent, or Firm—Edward C. Threedy

[57] ABSTRACT

A portable tamperproof and battery-powered alarm device used for locking in place, objects which need to be restrained from theft. The device is ideal for locking bicycles, mini-bikes, motor cycles, and the like, due to its portability and versatility. The device includes a casing for an alarm and operative circuit therefor and an object-restraining member. Once the device is activated by an internal switch, any interruptions of the circuit, such as breaking of the restraining member, cause an audible alarm to sound continuously until the device is manually reset. The locking and alarm device is a completely separate unit from the object-restraining member, and thus the latter may be readily replaced as needed.

4 Claims, 4 Drawing Figures

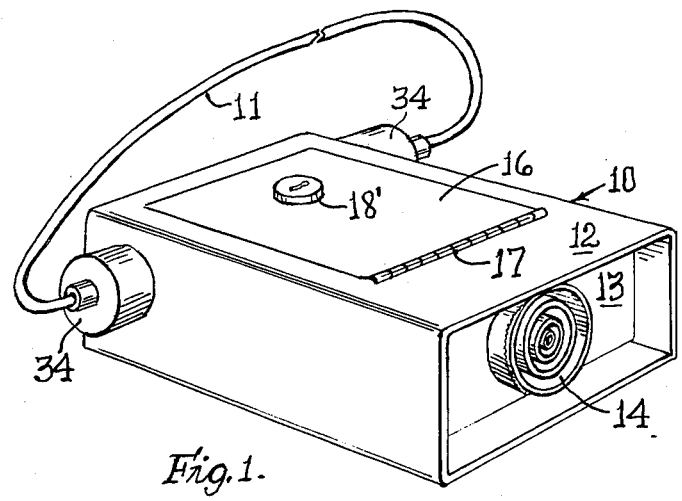
Fig. 1.
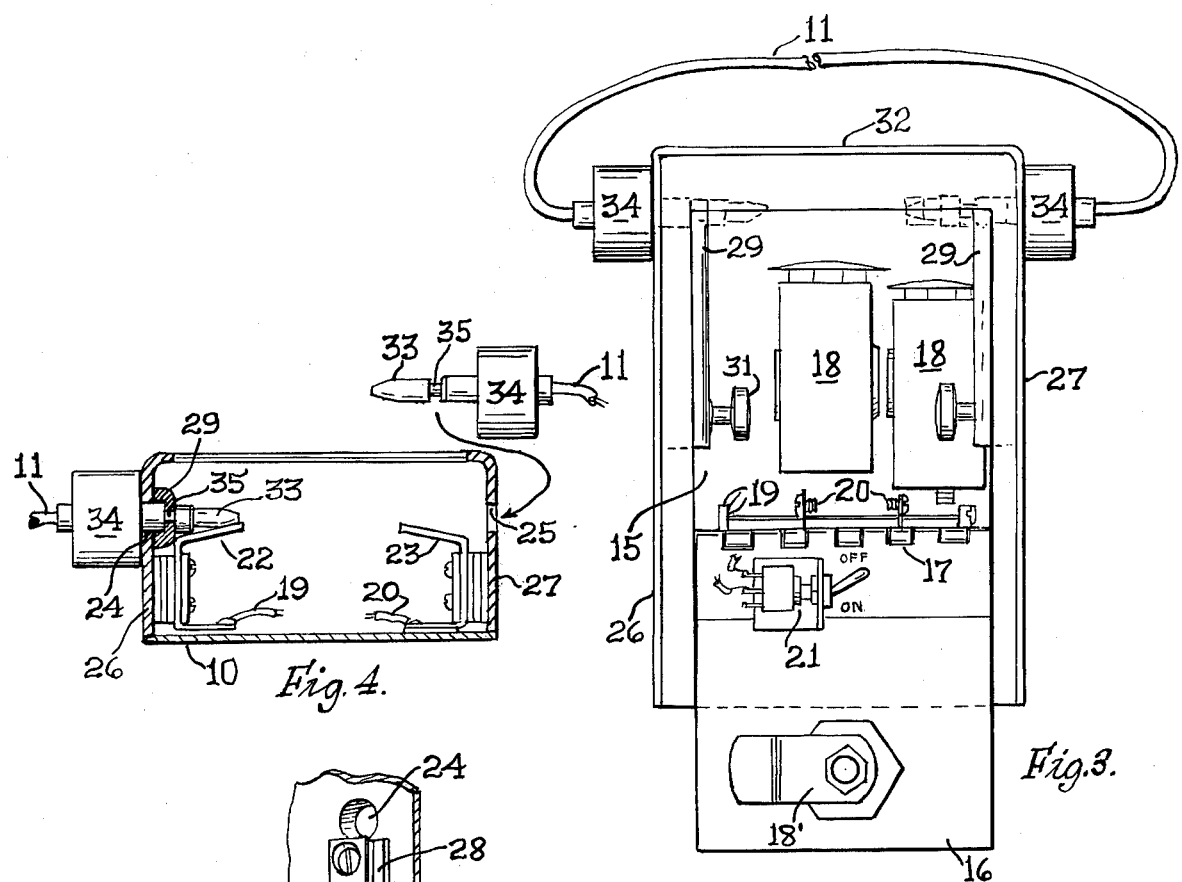
Fig. 4.
Fig. 3.
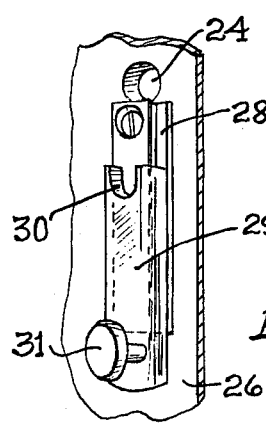
Fig. 2.

SELF-CONTAINED ALARM LOCK

SUMMARY OF THE INVENTION

A theftproof alarm lock that comprises a portable casing having a locked compartment for a power source and circuit for an audible alarm. The casing also provides means within the locked compartment whereby both ends of an object-restraining member in the form of an electrical conductor cable, may be readily and releasably connected thereto so as to become an integral component in the alarm circuit. By this arrangement, the object-restraining cable may be readily replaced if damaged or destroyed during an attempted theft. A circuit-actuating switch is also provided so that the casing and cable may be joined together and/or separated without the sounding of the audible alarm.

GENERAL DESCRIPTION

The device of this invention is shown by the accompanying drawings whereby the objects of the invention are achieved, and in which:

FIG. 1 is a perspective view of the selfcontained alarm lock;

FIG. 2 is a fragmentary perspective view of one of the slidable latches of this invention;

FIG. 3 is a top plan view of the device with the compartment shown in open condition; and FIG. 4 is a detailed sectional view of the alarm device showing one end of the restraining member attached to the casing, with the other end of the member detached therefrom.

Referring to the drawings, FIG. 1 shows a compact casing 10, preferably constructed from heavy-duty force-resistant metallic material or high-strength force-resistant plastic material.

Adapted to be connected to the casing 10 is an elongated flexible armored electric conductor cable 11. The cable 11 is of a length whereby it may readily embrace a restrained object while being wrapped around a movable object, such as a bicycle or the like.

As viewed in FIGS. 1 and 3, the casing 10 provides a top wall 12 and a recessed end wall 13 which houses an audio port 14. The top wall defines an opening 15 which is adapted to be closed by a compartment door 16 hinged along one edge 17 to the top wall. The door 16 includes a key-controlled lock 18', whereby the same may be selectively opened or secured in closed position as shown in FIGS. 1 and 3.

Within the casing 10 there is provided a sufficient electrical power source, in the form of batteries 18, which through selective terminals 19 and 20 are connected in circuit to an on-off toggle switch 21 carried by the inner wall surface of the door 16. The batteries 18 as well as the toggle switch 21 are also connected through the associated terminals 19 and 20 to contact fingers 22 and 23 carried within the hollow compartment of the casing 10.

As viewed in FIG. 4, the terminals 22 and 23 are in axial alignment with openings 24 and 25 formed in the opposite side walls 26 and 27 of the casing 10.

Within the hollow compartment of the casing 10 and mounted on each of the side walls 26 and 27 upon suitable track members 28, is a slide latch 29, one end of which is formed to provide a circular cut-out 30, while the other end provides an actuating knob 31. The slide latches 29 are adapted to move parallel to the side walls 26 and 27 in the direction of the end wall 32, with a portion thereof proceeding beyond the openings 24 and 25 formed in the side walls 26 and 27, such that the cut-out portion 30 of the one end of the slide latch 29 lies in actual alignment with such openings.

The cable 11 has each of its ends provided with an insert pin 33 which is carried by a reinforced insulating block 34. The insert pin 33 has a recessed circular diameter portion 35. The length of the recessed portion 35 is substantially equal to the depth of the curved cut-out portion 30 of the slide latch 29, such that when the pin 33 is inserted into its respective opening 24-25, the recessed portion 35 will lie in the linear path of movement of the slide 29 and receive the curved cut-out portion 30 thereof so as to lock the same in position within the casing 10, as viewed in FIG. 4. When the insert pin 33 is in such latched position, its insert end will be in contact with the respective terminal 22, or 23, completing an electrical circuit therethrough and through the armored electrical conductor cable 11.

In practice the cable 11 may be wound around about a stationary object and a movable object, and with its opposite insert pins 33 then inserted into their respective openings 24 and 25 formed in the side walls 26 and 27 of the casing 10, with the cover 16 in its open position the slidable latches 29 may be moved over their respective tracks 28 so as to latch the insert pins 33 to the casing 10 and in contact with their respective terminals 22 and 23. The operator may then actuate the toggle switch 21, completing the electrical circuit from the battery power source 18 through the respective terminals 19 and 20, toggle switch 21, terminals 22 and 23, and the cable 11. The door 16 may then be closed and locked in such position through the actuation of the key lock 18', thus securing the object to the alarm device.

Upon destruction of the cable 11 or any interruption of the circuit by the destruction of any of the components thereof heretofore noted, the electrical audible alarm may be sounded through the alarm port 14 and will be continued until the toggle switch 21 is reset.

The advantage that is present in this invention is that in the devices of the prior art, the destruction of any one of the components of the entire device rendered the whole device inoperative for its purpose. It has been found that the point of destruction of alarms of this nature is the restraining member or cable, and in the prior art devices the destruction of the cable rendered the entire device inoperative. In the present device, the destruction of the cable has no effect on the device contained within the casing 10, and the cable 11 may be readily replaced so that it will perform its desired function.

The device as described is small in size and lightweight and therefore completely portable. Being conveniently portable, its presence in a non-operative condition does not interfere with the movement of the object to be restrained or restrict the movement of the person who desires to employ the device as an anti-theft means.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A self-contained portable alarm lock having a battery-powered electric circuit and audio alarm components,
   a. a portable rectangular shaped case for the electric circuit and audio alarm components,
   b. a door in one wall of said case including a lock therefor,
   c. a current-conductive object-restraining member, the free ends of which provide insert pins adapted to be restrictively attached to said case,
   d. openings formed in opposite side walls of said case adjacent one end thereof for receiving said insert pins provided by the free ends of said object-restraining member,
   e. a pair of elongated U-shaped bar type manually operated slidable latches carried on confronting interior opposite side walls of said case, with said latches movable in the direction of said openings and into contact with said insert pins when the same are projected into said openings for releasably latching the same to said case,
   f. track members on said confronting interior opposite side walls over which said manually operated latches are slidably moved into and out of latching contact with said latching pins,
   g. means in contact with said insert pins of said object-restraining member when the same are projected into said openings and in a position to be attached to said case by said slidable latches for connecting said object-restraining member in the alarm circuit of the portable alarm lock, and
   h. concealed means within said case cooperating with said restraining member for selectively conditioning for actuation the alarm circuit.

2. A self-contained portable alarm lock as defined by claim 1 wherein said means in contact with each end of said restraining member when the same are positioned to be attached to said case, comprises yieldable circuit terminals.

3. A self-contained portable alarm lock as defined by claim 1 wherein said concealed means cooperating with said restraining member for selectively conditioning for actuation the alarm circuit, comprises a switch.

4. A self-contained portable alarm lock as defined by claim 3 wherein said means in contact with each end of said restraining member when the same are positioned to be attached to said case, comprises yieldable circuit terminals.

* * * * *